US00RE34402E

United States Patent [19]

Williams

[11] E Patent Number: Re. 34,402

[45] Reissued Date of Patent: Oct. 12, 1993

[54] FLEA TRAP UTILIZING NIGHT-LIGHT

[76] Inventor: Clarence O. Williams, P.O. Box 7203, Rocky Mount, N.C. 27804

[21] Appl. No.: 892,237

[22] Filed: Jun. 2, 1992

Related U.S. Patent Documents

Reissue of:

[64] Patent No.: 5,044,112
Issued: Sep. 3, 1991
Appl. No.: 590,678
Filed: Oct. 1, 1990

[51] Int. Cl.[5] ..... A01M 1/04

[52] U.S. Cl. ..... 43/113; 43/114; 43/115

[58] Field of Search ..... 43/113, 114, 115

[56] References Cited

U.S. PATENT DOCUMENTS

| | | | |
|---|---|---|---|
| 1,461,169 | 7/1923 | Wilson | 43/113 |
| 4,212,129 | 7/1980 | Shumate | 43/113 |
| 4,566,220 | 1/1986 | Justice | 43/113 |
| 4,654,998 | 4/1987 | Clay | 43/115 X |
| 4,686,789 | 8/1987 | Williams | 43/113 |
| 4,829,702 | 5/1989 | Silvandersson | 43/114 |
| 5,142,815 | 9/1992 | Birdsong | 43/113 |

OTHER PUBLICATIONS

"Night Light Offers a Shining Solution to Flea Problem", St. Petersburg Times of Times Publishing Co. Tues. Jul. 5, 1988.

"Bright and Brief", The Associated Press, New Orleans, Sunday Jun. 25, 1989.

"Keep Soap at Your Fingertips", St. Petersburg Times of Times Publishing Co. Dec. 24, 1989.

Regional News, by Carol Baker, Proprietary of the United Press International 1990, Aug. 20, 1990 BC Cycle.

"Patents; A Nontoxic Trap to Catch Insects", The New York Times, Financial Desk Section, Sep. 12, 1992.

*Primary Examiner*—Mark Rosenbaum
*Assistant Examiner*—Jeanne M. Elpel
*Attorney, Agent, or Firm*—OLive & Olive

[57] ABSTRACT

A flea trap uses an electrical receptacle mounted night-type lamp as a light source for attracting the fleas and means providing a sticky landing surface adjacent the source for trapping the fleas.

7 Claims, 3 Drawing Sheets

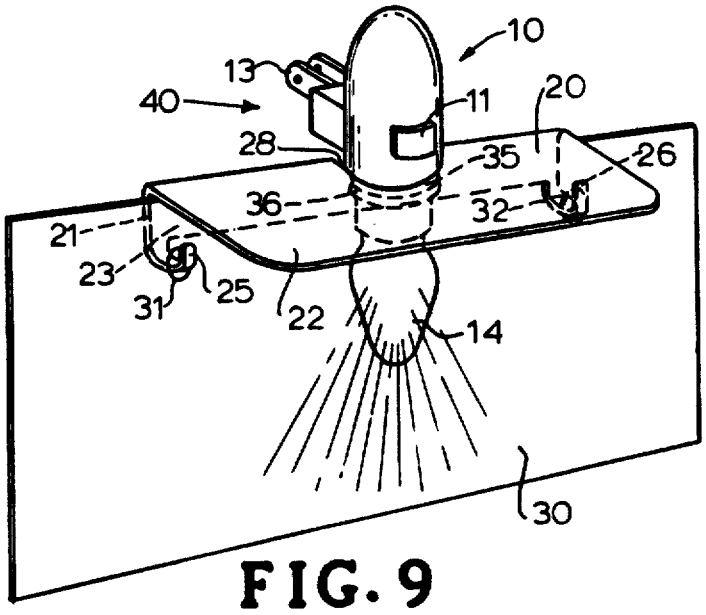
FIG. 9
FIG.10
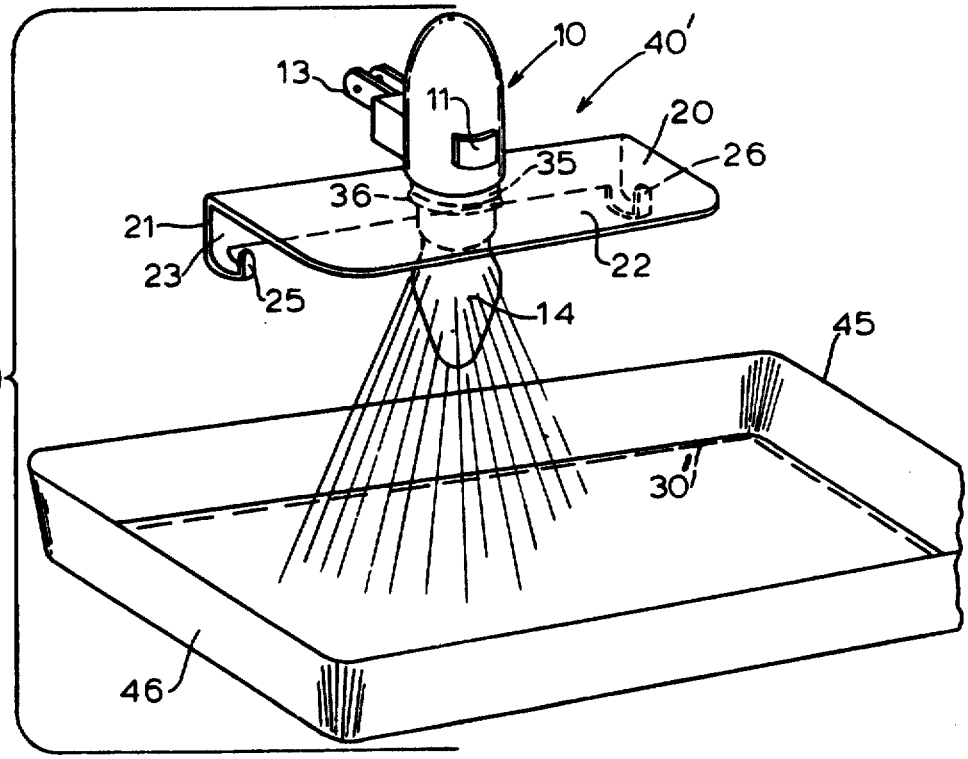

FLEA TRAP UTILIZING NIGHT-LIGHT

Matter enclosed in heavy brackets [ ] appears in the original patent but forms no part of this reissue specification; matter printed in italics indicates the additions made by reissue.

BACKGROUND OF THE INVENTION

1 Technical Field

The present invention relates to insect traps and particularly to a trap utilizing a conventional receptacle mounted electric night-light as a light source for luring and exterminating fleas.

2 Background Art

U.S. Pat No. 4,157,629 teaches use of an electrically energized specific invisible light source, namely, UV radiation, for attracting flying insects. U.S. Pat. No. 3,513,585 teaches a trap for trapping flying insects in which upwardly reflected light as well as upwardly radiated light from a visible electrically energized flourescent lamp source is used to attract flying insects. Fleas, unlike flying insects move by leaping or hopping from position to position by reason of being wingless and non-flying. A white electric light suspended over a pan of water has been used but has not proven effective for trapping large number of fleas. Because of the nature of fleas, a trap for trapping wingless, non-flying fleas must take into account many considerations that do not affect traps for trapping flying insects. Thus, a flea trap must be accessible to the fleas that hop from a source such as a carpet infested with fleas. A trap which is positioned several feet in the air may be completely suitable for catching flying insects but may be totally unsuited for catching fleas.

U.S. Pat. No. 4,566,220 describes an effective yet simple flea trap in which an electrically energized green light is used as the light source. The green light source is suspended immediately below a cover having a light reflective surface and the reflected green light as well as the directly radiated green light is directed downwardly to a shallow pan having a sticky substance and over which the light and cover are supported.

The present invention seeks to simplify the flea trap construction by associating an electrical night-light as the light source and a reflector and sticky landing surface with the electrical night-light.

DISCLOSURE OF INVENTION

A flea trap according to the invention preferably uses a night-light as the light source. The night-light housing conventionally used to support a lamp shade is instead used to support a light reflector so as to provide both downwardly directed reflected as well as radiated light to attract the fleas to be trapped. A sticky landing surface is provided by a sheet of flypaper supported vertically by a night-light housing or alternatively by a sheet of flypaper or other sticky substance positioned horizontally or in a pan below the light source. Thus, the conventional baseboard receptacle mounted night-light of the type in widespread household use is made to serve a double purpose.

BRIEF DESCRIPTION OF THE DRAWINGS

FIG. 9 is a perspective view of the near-floor-level mounted night-light bracket/reflector and associated vertically-hung flypaper sheet being employed together to catch fleas. FIG. 10 is a perspective view illustrating how the near-floor-level mounted flea trap of the invention is employed in conjunction with a pan member supporting a flypaper sheet or alternatively filled with a flea-trapping liquid.

BEST MODE FOR CARRYING OUT THE INVENTION

Figure 1:
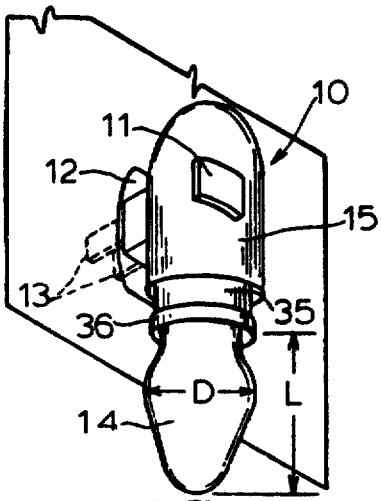
FIG. 1 is a fragmentary perspective view of a conventional electrical night-light plugged into a conventional baseboard or near-floor-level wall receptacle.
Figure 2:
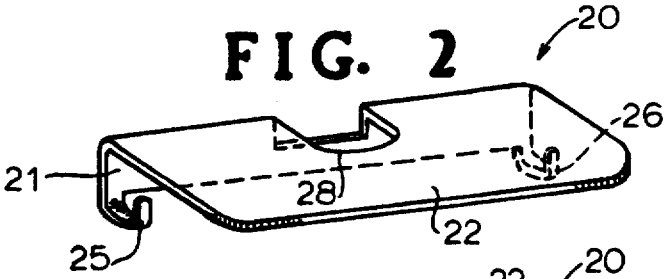
FIG. 2 is a perspective view of a night-light mountable bracket/reflector as employed with the present invention.
Figure 7:
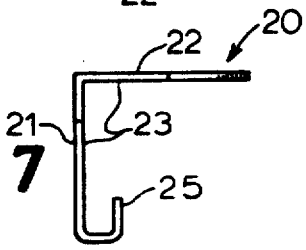
FIG. 7 is a side elevation view of the bracket/reflector.
Figure 3:
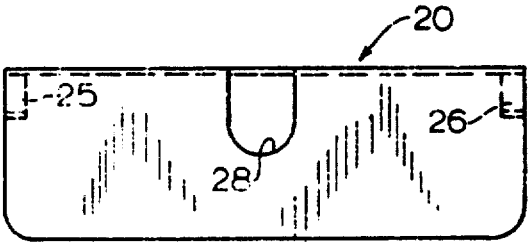
FIG. 3 is a top plan view of the bracket/reflector of FIG. 1.
Figure 4:
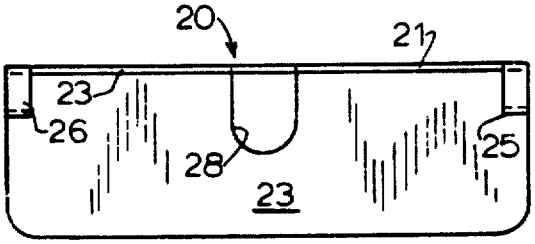
FIG. 4 is a bottom plan view of the bracket/reflector of FIG. 1.
Figure 5:
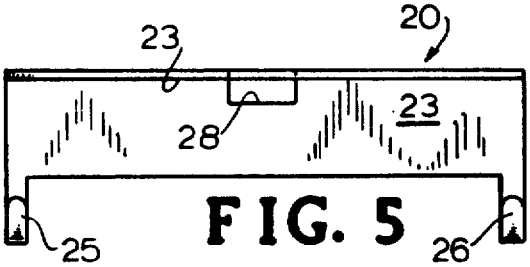
FIG. 5 is a front elevation view of the FIG. 1 bracket/reflector.
Figure 6:
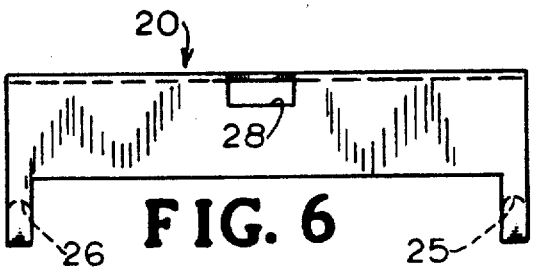
FIG. 6 is a rear elevation view of the FIG. 1 bracket/reflector.
Figure 8:
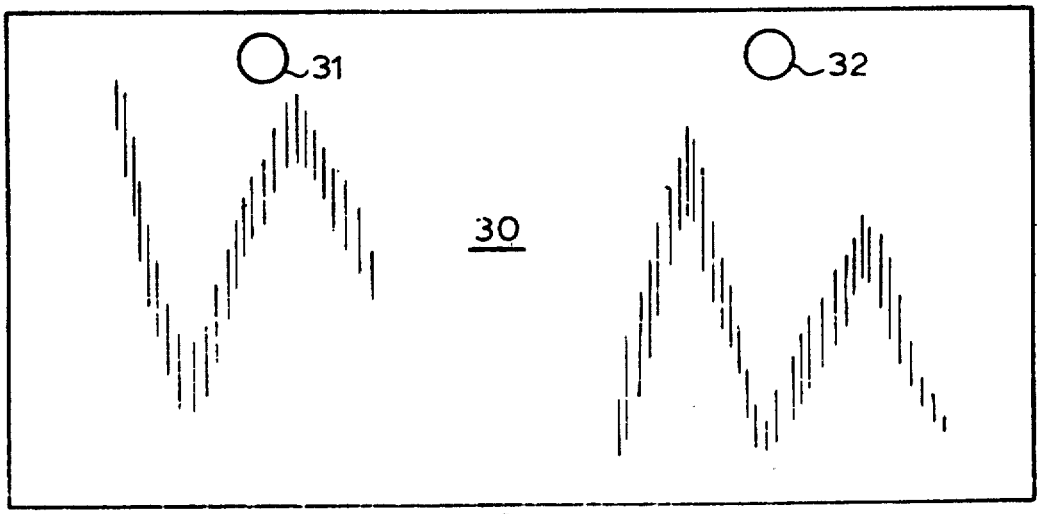
FIG. 8 is a front side view of a flypaper sheet employed with the invention.

Referring initially to FIG. 1, a conventional electrical night-light 10 is formed with housing 15 of electrically-insulating material and incorporates a bulb socket, not shown, and built-in switch 11. Night-light 10 is illustrated as being mounted in a near-floor-level baseboard or wall receptacle 12 by means of horizontal prongs 13. Night-light 10 receives in the housing socket a light bulb 14 vertically oriented and preferably of a green color which has been proven through tests to attract fleas in great quantities. Light bulb 14 in one embodiment has a diameter D of approximately ⅞" and a length L of approximately 1½". Bulb 14 is energized through its socket, switch 11 and prongs 13.

FIGS 2 through 6 illustrate a bracket/reflector 20 which may be formed, for example, from aluminum sheet metal or from molded plastic. Bracket/reflector 10 is L-shaped with a back wall member 21 and a top wall member 22. Top wall member 22 and back wall member 21 are provided with inside reflective surfaces 23. Reflective surfaces 23 may be painted in a reflective color or a reflective material may be adhered to interior surfaces of wall member 21, 22 to provide the desired reflective surfaces. Polished aluminum sheet may also be employed to provide reflective surfaces. Back wall member 21 has a pair of downwardly extending hangers or hooks 25, 26 on opposed ends of wall member 21. In addition, top member 22 has a slot 28 which extends downward into a portion of back wall member 21 for receiving the housing portion 15 or light 10. A preformed flypaper sheet 30 having an exposed sticky surface is provided with a pair of holes 31, 32 which mate with and mount flypaper sheet 30 on hangers 25, 26 of back wall member 21 in vertical orientation so as to extend both behind, to the side and below bulb 14 at near-floor-level.

Referring next to FIG. 9, night-light 10 receives bracket/reflector 20 as seen in FIG. 9. Bulb 14 is fed through slot 28 and recessed groove 35 slides within slot 28. Recessed groove 35 is conventionally used to support a snap-on lamp shade. Shoulder 36 formed in housing 15 below groove 35 prevents bracket-reflector 20 from sliding off as illustrated. Flypaper sheet 30 is mounted on hangers 25, 26 with an exposed sticky surface as previously mentioned. As flea trap 40, composed of light 10, bracket/reflector 20 and flypaper sheet 30, is mounted on near-floor-level receptacle 12 and light 14 is turned on, fleas at floor level or in a nearby infested rug, for example are attracted to the mixed downwardly-directed reflected and radiated light. The flea jump from the floor level upward and towards light 14 to be caught on flypaper sheet 30 where they eventually die.

In FIG. 10, flea trap 40′ is mounted on near-floor-level receptacle 12 a in FIG. 9 and flypaper sheet 30′ instead of being hung vertically from hangers 25, 26 rests flat and horizontally and is retained in a shallow, rectangular pan 45 resting on the floor or rug and placed beneath bulb 14 and with an exposed sticky surface. When bulb 14 is illuminated, the light is reflected and radiated downwardly onto the base of pan 45 enabling the fleas to be trapped by flypaper sheet 30′ lying in the bottom of the pan as the fleas jump upward toward green light 14 and then fall onto the sticky landing surface provided by flypaper sheet 30′. In one embodiment pan 45 was approximately 11″ long and 7″ wide and its walls 46 were approximately ⅜″ high.

Figure 11:
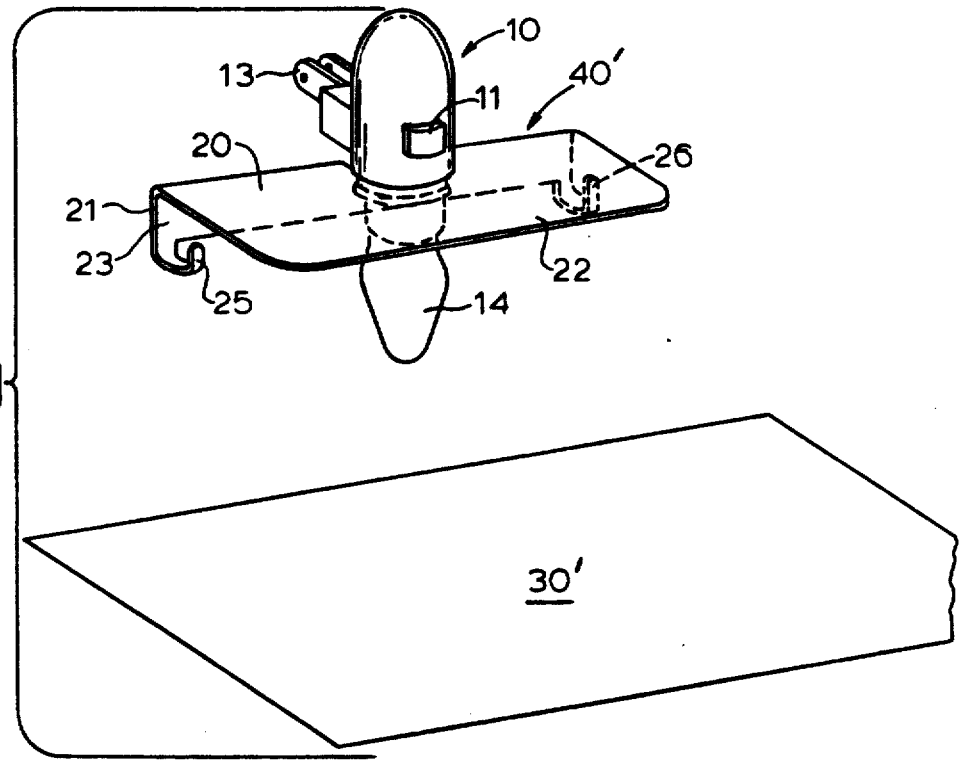
FIG. 11 is a perspective view illustrating the near-floor-level mounted flea trap employed in conjunction with a flat flypaper sheet resting on the floor or infested rug beneath the bracket/reflector.

Alternatively, pan 45 of FIG. 10 may be filled with a predetermined level of sticky liquid as previously referred to in U.S. Pat. No. 4,566,220. The liquid is preferably of an oily formula which is non-toxic and which can be safely used in a home where there are small children and pets. Liquids such as corn oil, peanut oil, Wesson oil, Crisco oil, baby oil, castor oil and mineral oil are all effective sticky liquids for application with the invention and are non-offensive to the fleas. The fleas are still lured by the light and jump toward the light and into the liquid-filled pan 45. FIG. 11 is further illustrative of how flea trap 40′ may be employed. Flea trap 40′ is plugged into a conventional near-floor-level wall outlet 12 and flypaper sheet 30′ with an exposed sticky surface is placed on the floor or infested rug beneath trap 40′. When bulb 14 is turned on, fleas are lured toward light produced by bulb 14 and are trapped on flypaper sheet 30′.

Figure 12:
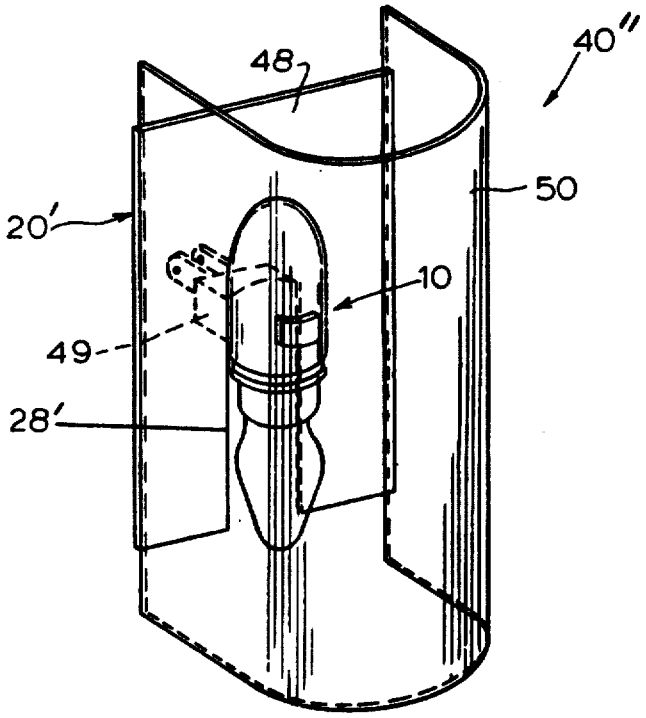
FIG. 12 is a perspective view illustrating an alternative embodiment of the invention flea trap in which a near-floor-level mounted night-light is surrounded by a U-shaped transparent or translucent sheet member resting on the floor or infested rug and having an external sticky surface for trapping the fleas.

FIG. 12 is illustrative of a further alternative embodiment flea trap 40″. Flea trap 40″ utilizes an alternative bracket/reflector arrangement 20′. Bracket/reflector arrangement 20′ includes a reflector back wall 48 mounted on night-light 10 by means of slot 28′ by sliding bracket/reflector arrangement 20′ onto shoulder 49 of night-light 10. A transparent U-shaped Mylar sheet 50 is affixed to bracket/reflector arrangement 20′ and surrounds night-light 10. Mylar sheet 50 has a sticky flypaper-type surface on the outside thereof and as fleas jump towards light 10 they are caught on the sticky surface. It is anticipated that a clear or white light bulb might be used and that the Maylar film be of a green nature to provide a green tint to lure the fleas to the trap 40″. Alternatively, sheet 50 may be arranged to rest and be supported on the floor or rug.

In all embodiments and situations, the basic principal is to lure fleas into the trapping surface whether it be the liquid-filled pan or a flypaper-type material by means of a light source and it has been discovered through testing that a green light source works most favorably. A conventional low wattage incandescent bulb of appropriate color with a household night-light size meets the desired requirements of the invention. The light lures the fleas to the trap where they are entrapped and eventually die. Essentially any shade or degree of illuminosity, i.e. bright or dull, appears to be effective with green being particularly effective and white also being practical though not necessarily as effective. The bulb may be vertically oriented as illustrated or horizontally oriented as with some night-light configurations.

The invention near-floor-level mounted insect trap advantageously lures the fleas from the carpet and furniture wherein conventional methods of spraying for fleas intends to drive the fleas to other areas. Also, while spraying kills adult fleas it dissipates and is virtually non-effective for killing of young fleas which come from eggs left in the area. The invention insect trap attracts daily any fleas in the area and over a period of time has been found to effectively eliminate virtually all fleas within that area. While primarily intended to lure and trap fleas, it is recognized that other insects may also be trapped and exterminated by the invention device.

I claim:

1. A trap for catching wingless, non-flying fleas, comprising:

(a) an electrically energized, visible light source having a pair of horizontal prongs through which the source is energized to produce a near-floor-level light [source] when said prongs are installed in a mating near-floor-level electrical receptacle, a bulb housing formed of electrically insulating material secured to and supported by said prongs and enclosing an electrically conductive bulb socket electrically connected to said prongs and a vertically oriented electric bulb installed in said socket and energized said socket and prongs to produce [said] *a* visible light [source];

(b) a light reflector supported by said housing, having hook means and oriented with respect to the position of said bulb to provide a horizontal reflecting surface above said bulb to reflect light produced by said bulb downwardly and outwardly to mix with other non-reflected light radiated downwardly and outwardly by said bulb; and (c) means providing a sticky landing surface located below said light source and in a position accessible to the fleas to be trapped, said means comprising a sheet of sticky substance supported by said hook means in a vertical plane below said reflecting surface and behind said bulb.

2. A trap as claimed in claim 1 wherein said bulb comprises a green bulb productive of a visible green light [as said source].

3. A trap for catching wingless, non-flying fleas comprising:

(a) an electrically energized, visible light source having a pair of prongs through which the source is energized to produce a near-floor-level light [source] when said prongs are installed in a mating near-floor-level electrical receptacle, a bulb housing formed of electrically insulating material secured to and supported by said prongs and enclosing an electrically conductive bulb socket electrically connected to said prongs and an electric bulb installed in said socket and energized through said socket and prongs to produce [said] *a* visible light [source]; and (b) light transmitting means providing a sticky landing surface on the exterior thereof illuminated by and operatively associated with said source and accessible to the fleas sought to be trapped, said means providing a sticky landing surface comprising a transparent sheet member at least partially surrounding and supported on structure comprising said source such that said light is visible therethrough and having a sticky substance on the exterior thereof to establish said sticky landing surface illuminated by said [source] *light.*

4. A trap as claimed in claim 3 wherein said bulb comprises a green bulb productive if a visible green light [as said source].

5. A trap as claimed in claim 3 wherein said means providing a sticky landing surface comprises a transparent U-shaped sheet member surrounding said source.

6. A trap for catching wingless, non-flying fleas, comprising:

(a) an electrically energized, visible light source having a pair of horizontal prongs through which the source is energized to produce a near-floor-level light [source] when said prongs are installed in a mating near-floor-level electrical receptacle, a bulb housing formed of electrically insulating material extending outwardly from and secured to and supported by said prongs and enclosing an electrically conductive bulb socket electrically connected to and supported by said prongs and an electric bulb installed in said socket and energized through said socket and prongs to produce [said] *a* visible light [source];

(b) a light reflector supported by said housing and oriented with respect to the position of said bulb to reflect light produced by said bulb downwardly and outwardly to mix with other non-reflected light radiated downwardly and outwardly by said bulb; and (c) insect trapping means located below said light source and operative to catch the fleas to be trapped when lured by said light [source].

*7. A trap for catching wingless, non-flying fleas, comprising:*

*(a) an electrically energized, visible light source having a pair of prongs through which the source is energized to produce a near-floor-level light when said prongs are installed in a mating near-floor-level electrical receptacle, a bulb housing formed of electrically insulating material secured to and supported by said prongs and enclosing an electrically conductive bulb socket electrically connected to said prongs and an electric bulb installed in said socket and energized through said socket and prongs to produce light, said bulb being positioned such that said bulb and the light produced thereby are visible to the fleas to be trapped; and*

*(b) insect trapping means providing a near-floor-level planar trapping surface supported by structure comprising said source, below and illuminated by said light at near-floor-level and in a position which is exposed to the fleas to be trapped and is directly accessible to and operative to catch the fleas to be trapped when lured by said light.*

* * * * *

UNITED STATES PATENT AND TRADEMARK OFFICE

CERTIFICATE OF CORRECTION

PATENT NO. : RE 34,402

DATED : October 12, 1993

INVENTOR(S) : Clarence O. Williams

It is certified that error appears in the above-identified patent and that said Letters Patent is hereby corrected as shown below:

Column 5, line 16, correct "if" to read --of--.

Signed and Sealed this

Seventh Day of June, 1994

Bruce Lehman

*Attest:*

BRUCE LEHMAN

*Attesting Officer*

*Commissioner of Patents and Trademarks*